(No Model.)
J. COSTELLO.
BUTTON OR STUD.
No. 320,761. Patented June 23, 1885.
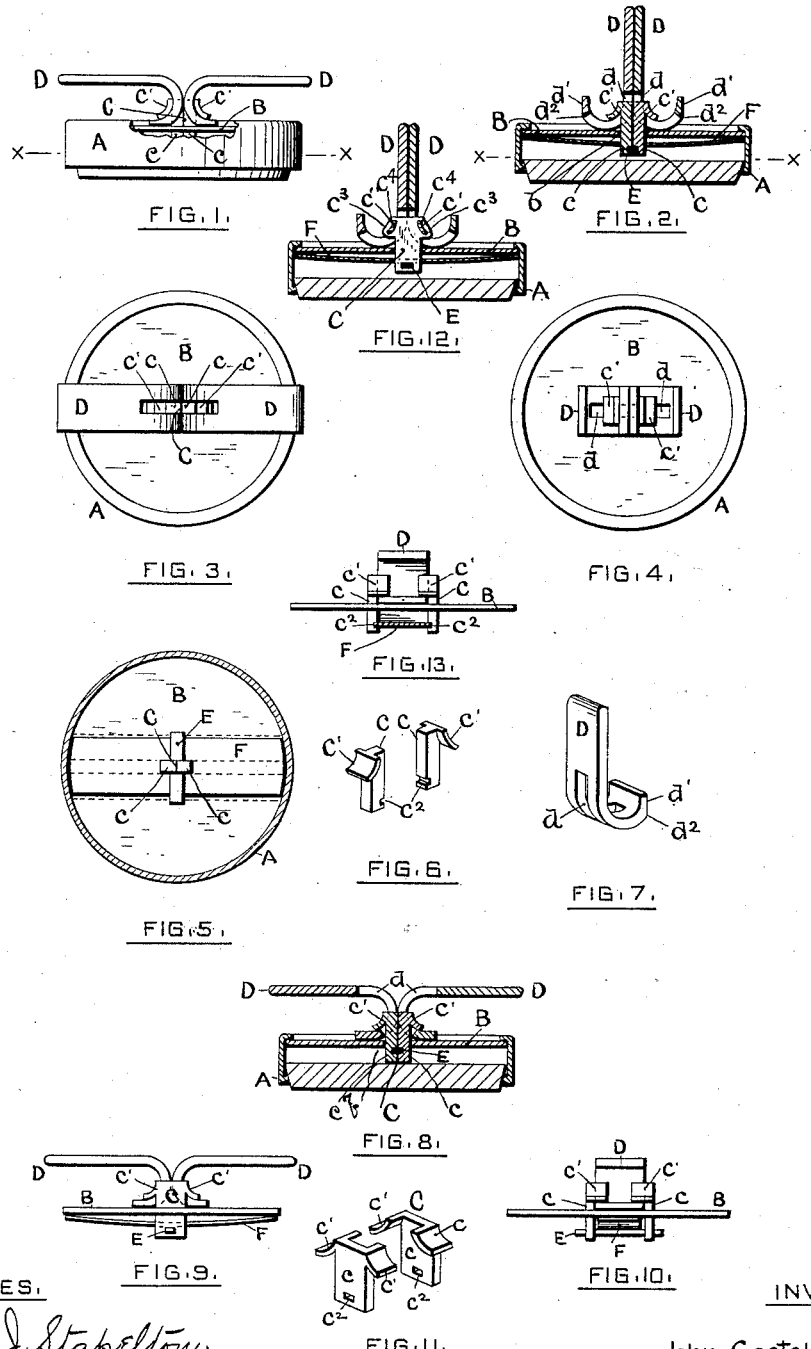
WITNESSES.
INVENTOR
John Costello.
by Edson Salisbury Jones
Attorney.

UNITED STATES PATENT OFFICE.

JOHN COSTELLO, OF NORTH ATTLEBOROUGH, MASSACHUSETTS, ASSIGNOR TO COOKE & EDDY, OF PROVIDENCE, RHODE ISLAND.

BUTTON OR STUD.

SPECIFICATION forming part of Letters Patent No. 320,761, dated June 23, 1885.

Application filed May 1, 1885. (No model.)

*To all whom it may concern:*

Be it known that I, JOHN COSTELLO, of North Attleborough, in the county of Bristol and State of Massachusetts, have invented a new and useful Improvement in Buttons and Studs; and I do hereby declare the following specification, taken in connection with the accompanying drawings, forming a part of the same, to be a description thereof.

This invention relates to that variety of buttons and studs having a shoe composed of two J-shape members or parts, which are hooked to the button or stud head, so as to be turned into positions to allow the article easily to be applied and removed.

The invention consists in providing the head with a stud made in two parts, to enable the members of the shoe to be easily and conveniently combined with the head, the said stud being provided with curved flanges or hinge-members, upon which the shoe parts are hooked to turn.

It also consists in arranging such a stud (whether in one or two parts) with relation to the head so that the stud shall have a longitudinal sliding movement with relation to the head, and in combining therewith a spring or springs to hold the shoe-member in frictional engagement with the head, as will hereinafter appear.

In the accompanying drawings, Figure 1 shows in side elevation, partially broken away, a sleeve-button embodying the invention. Fig. 2 represents the same in central vertical section. Figs. 3 and 4 show rear views of the same, with the shoe-members in positions to hold the button in place and to allow it to be applied. Fig. 5 represents a horizontal section through line $x\ x$ of Fig. 1. Fig. 6 shows in perspective the two parts of the stud detached from the button and separated. Fig. 7 represents one of the shoe-members in perspective. Fig. 8 shows in section a button without a spring. Fig. 9 represents a side view of a portion of a button, the two-part stud being arranged to embrace the shoe-members externally at their edges. Fig. 10 shows a side view at right angles to Fig. 9. Fig. 11 represents in perspective the two-part stud of such button. Fig. 12 shows in section a button in which the stud is not divided, and with which a spring is combined to hold the shoe-members in frictional engagement with the head at all times. Fig. 13 shows a modification of Fig. 12.

A is the button-head, which may be of any preferred form or style, and B is the back plate thereof.

C is the stud, which (except in Fig. 12) is composed of two parts, $c\ c$, having curved flanges or hinge-members $c'$, upon which the shoe-members D D are hooked and turn. These shoe-members are J shape, and each (except as shown in Figs. 9, 10, and 13) is provided with a slot, $d$, of a width equal to the thickness of the stud C which passes through the said slots, as shown in Fig. 2.

The shoe-members D D are combined with the plate B by passing the stud parts $c\ c$, respectively, through the slots $d\ d$ until the curved flanges or hinge-members $c'$ engage the concave faces of the curved portions of the shoe-members. The stud parts $c\ c$ are then brought together and passed through a hole, $b$, in the plate B, and are secured in place by a pin, E, passing through notches $c^2$ on the inner sides of the stud parts, as shown in Figs. 2 and 5, or in any preferred manner.

If it be desired to lock the shoe-members in a closed position, their curved ends are preferably flattened at $d'$, so as to produce salient angles $d^2$ or cam-surfaces, and a spring, F, (or two springs, as shown by dotted lines in Fig. 5,) is located between the plate B and pin E, Figs. 2 and 5. With this arrangement the stud C has a sliding longitudinal movement with relation to the button-head, and the spring F holds the shoe-members D in constant frictional engagement with said head, thereby taking up the wear on said members and locking them in a closed position. (Shown in Fig. 1.)

If it be not desired to lock the shoe parts in a closed position, the spring or springs may be dispensed with and the pin E secure the stud parts $c\ c$ on the plate B, as shown in Fig. 8.

In place of passing the stud parts $c\ c$ through slots in the shoe-members D the shoe-members may be without slots and the stud parts be constructed as shown in Figs. 9, 10, and 11, and be arranged to embrace the edges of the shoe-members, as shown in Fig. 10, each stud part $c$ being provided with two curved flanges or hinge-members, $c'$.

It will be observed that when a spring, F, or springs are employed the stud $c$ is capable of a longitudinal movement with relation to the head, so that the spring can take up the wear on the shoe-members D and plate B, and thereby keep the button in good working order during long use, and also lock the shoe-members in position if they be provided with cam-surfaces on their curved portions.

This feature of the longitudinally-movable stud, combined with a spring or springs, may be utilized in a button where the stud is not divided into two parts, as heretofore described, but is made in one part, as shown in Fig. 12. In this construction the stud passes through slots $d$ in the shoe-members, and is provided with ears $c^3$ through holes $c^4$, in which the curved hinge-members $c'$ are inserted or driven, the curved portions of the shoe-members being furnished or not, as desired, with cam-surfaces to enable said members to be locked.

As shown in Fig. 13, the fastening-pin E may be dispensed with and the spring F pass through notches $c^2$ in the sides of the stud parts $c$ $c$ to hold the stud in place and to operate thereon.

By making the stud C in two parts, $c$ $c$, the shoe-members are more readily and economically combined with the head than if the stud were in one part, and by making the stud longitudinally movable and employing a spring or springs the advantages hereinbefore set forth are attained.

What I claim, and desire to secure by Letters Patent, is—

1. As an improved article of manufacture, a button or stud having a shoe composed of two J-shape members, and a head furnished with a stud in two parts, $c$ $c$, provided with curved flanges or hinge-members $c'$, which engage the concave faces of the curved portions of the shoe-members and hinge or hook them to the head, substantially as set forth.

2. The combination, with a button or stud head, of a stud, C, provided with curved flanges or hinge-members $c'$, and capable of a longitudinal movement with relation to the head, as described, the J-shape shoe-members hooked upon said stud, and a spring or springs operating to take up the wear on the shoe-members and the head, substantially as set forth.

3. The combination of the J-shape shoe-members, and the stud in two parts, $c$ $c$, attached to the button-head, provided with curved flanges or hinge-members $c'$, and embracing the edges of the shoe-members and hinging or hooking them to the head, substantially as set forth.

JOHN COSTELLO.

Witnesses:
    EDSON SALISBURY JONES,
    HENRY J. STAPELTON.